(12) United States Patent
Honjo et al.

(10) Patent No.: US 7,421,169 B2
(45) Date of Patent: Sep. 2, 2008

(54) OPTICAL FIBER CABLE

(75) Inventors: Takeshi Honjo, Chiba (JP); Satoru Shiobara, Chiba (JP); Tsuyoshi Shimomichi, Chiba (JP); Keiji Ohashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 158 days.

(21) Appl. No.: 10/870,149

(22) Filed: Jun. 18, 2004

(65) Prior Publication Data

US 2004/0258375 A1 Dec. 23, 2004

(30) Foreign Application Priority Data

Jun. 20, 2003 (JP) .......................... P2003-176958
Aug. 20, 2003 (JP) .......................... P2003-296218

(51) Int. Cl.
*G02B 6/44* (2006.01)

(52) U.S. Cl. .................. 385/100; 385/102; 385/103; 385/104; 385/106; 385/109; 385/110; 385/111; 385/112; 385/113; 385/115

(58) Field of Classification Search ................ 385/103, 385/102, 100, 105, 112–113
See application file for complete search history.

(56) References Cited

U.S. PATENT DOCUMENTS

| | | | |
|---|---|---|---|
| 4,645,298 A | 2/1987 | Gartside, III | |
| 4,688,888 A * | 8/1987 | Kimmich | 385/113 |
| 4,770,489 A | 9/1988 | Saito et al. | |
| 4,779,953 A * | 10/1988 | Ohta et al. | 385/103 |
| 4,844,575 A | 7/1989 | Kinard et al. | |
| 4,874,219 A | 10/1989 | Arroyo et al. | |
| 4,938,560 A | 7/1990 | Arroyo et al. | |
| 4,946,237 A | 8/1990 | Arroyo et al. | |
| 4,993,804 A * | 2/1991 | Mayr et al. | 385/103 |
| 5,125,063 A | 6/1992 | Panuska et al. | |
| 5,345,526 A * | 9/1994 | Blew | 385/112 |
| 6,167,178 A | 12/2000 | Nave | |
| 6,167,179 A * | 12/2000 | Weiss et al. | 385/103 |
| 6,249,629 B1 | 6/2001 | Bringuier | |
| 6,504,980 B1 | 1/2003 | Gaillard et al. | |
| 6,611,646 B1 | 8/2003 | Norris et al. | |
| 6,807,347 B2 * | 10/2004 | McAlpine et al. | 385/103 |
| 2004/0120664 A1 * | 6/2004 | Dewitt | 385/103 |

FOREIGN PATENT DOCUMENTS

| | | |
|---|---|---|
| JP | 59-7907 A | 1/1984 |
| JP | 61-68215 U | 5/1986 |
| JP | 61-143115 U | 9/1986 |
| JP | 5-28846 A | 2/1993 |
| JP | 5-27708 U | 4/1993 |
| JP | 9-73029 A | 3/1997 |

(Continued)

*Primary Examiner*—Brian Healy
*Assistant Examiner*—Guy G Anderson
(74) *Attorney, Agent, or Firm*—Sughrue Mion, PLLC

(57) ABSTRACT

An optical fiber cable that sustains reduced increase in transmission loss and optical fiber breakage when subject to external pressure exerted thereon, comprises an aggregate of elements including central buffer filaments disposed in the center part of the optical fiber cable and a plurality of optical fibers disposed around the central buffer filaments, as well as circumferential strength filaments disposed around the outer periphery of the aggregate of elements, and a sheath covering the circumferential strength filaments.

7 Claims, 8 Drawing Sheets

FOREIGN PATENT DOCUMENTS

| | | |
|---|---|---|
| JP | 9-166733 A | 6/1997 |
| JP | 10-148740 A | 6/1998 |
| JP | 11-183764 A | 7/1999 |
| JP | 2003-005002 A | 1/2003 |
| JP | 2003-66294 A | 3/2003 |
| JP | 2003-107307 A | 4/2003 |

* cited by examiner

OPTICAL FIBER CABLE

CROSS REFERENCE TO RELATED APPLICATIONS

This application is based upon and claims the benefit of priority from Japanese Patent Application No. 2003-176958 filed on Jun. 20, 2003 and Japanese Patent Application No. 2003-296218 filed on Aug. 20, 2003, both filed in the Japanese Patent Office, the entire contents of which are incorporated by reference herein.

BACKGROUND OF THE INVENTION

1. Field of the Invention

The invention relates to an optical fiber cable and more specifically, an optical fiber cable used for laying in premises.

2. Description of Related Art

Layer type optical fiber cable and loose tube distribution cable are known in the prior art as an optical fiber cable having an indispensable rigid tensile strength member, used for installation in premises.

As shown in FIG. 1, the layer type optical fiber cable 301 is constructed having a rigid central strength member 303 of steel wire or FRP (Fiber Reinforced Plastic) rod disposed in the center thereof, a plurality of optical fibers 305, disposed around the rigid central strength member 303, stranded either in one direction or in alternating directions (i.e. SZ), a wrap 307 disposed around the plurality of optical fibers 305, and a sheath 309 covering the wrap 307.

As shown in FIG. 2, the loose tube distribution cable 311 is constructed having tensile strength filaments 313 helically around a bundle of optical fibers 305 and a sheath 315 covering the tensile strength filaments 313. Because the loose tube distribution cable 311 does not have a rigid central strength member in the center part thereof, the cable 311 has an advantage in comparison to the cable 301, of bending more easily when installed. Further, as material of substantial specific gravity such as steel wire or FRP rod or the like is not used in the loose tube distribution cable 311 (as it is in the layer type optical fiber cable 301), the loose tube distribution cable 311 is lighter. Loose tube distribution cables 311 are disclosed in, for example, Japanese Unexamined Patent Publication No. Hei 11-183764 and Japanese Unexamined Patent Publication No. 2003-5002.

A problem affecting the layer type optical fiber cable 301 of the related art is that, as steel wire or FRP rod having a high modulus of rigidity is used for a central strength member, it is difficult to bend the optical fiber cable itself. Another problem affecting the layer type optical fiber cable 301 is that the optical fibers 305 are pressed against the rigid central strength member 303 in response to lateral pressure or compression, causing localized bending that increases transmission loss of the optical fiber.

The loose tube distribution cable 311 is improved with respect to the weaknesses inherent in the layer type optical fiber cable 301. However, when lateral pressure or compression is applied to the cable 311, optical fibers 305 therein are apt to cross over each other or tightly contact each other, resulting in an increase in transmission loss.

SUMMARY OF THE INVENTION

In order to solve the abovementioned problems, it is an object of the invention to provide an optical fiber cable with central buffer filaments disposed in the center part of loose tube distribution cable, thereby alleviating an increase of transmission loss and the breaking of the optical fiber when external lateral pressure or compression is applied to the optical fiber cable, resulting in improved quality of communications.

To realize this objective, according to a first aspect of the invention an optical fiber cable is provided comprising: an aggregate of elements comprising central buffer filaments and optical fibers radially outside of the central buffer filaments; and circumferential strength filaments radially outside of the aggregate of elements.

According to another aspect of the invention, the cross sectional area of the central buffer filaments is between 10% and 80% of the cross sectional area of the central buffer filaments, the optical fibers, and the circumferential strength elements combined.

According to another aspect of the invention the central buffer filaments include tensile strength filaments.

According to yet another aspect of the invention an optical fiber cable is provided comprising: an aggregate of elements comprising central strength filaments and optical fibers radially outside of the central strength filaments; and a wrap radially outside the aggregate of elements.

According to another aspect of the invention, the cross sectional area of the central strength filaments is between 10% and 80% of the cross sectional area of the central strength filaments, the optical fibers, and the wrap combined.

According to yet another aspect of the invention an optical fiber cable is provided comprising: an aggregate of elements comprising central buffer filaments, optical fibers radially outside the central buffer filaments, and interstitial filaments radially outside of said central buffer filaments and circumferentially disposed between the optical fibers; and circumferential strength filaments radially outside of the aggregate of elements.

According to another aspect of the invention, the cross sectional area of the central buffer filaments is between 10% and 80% of the cross sectional area of the central buffer filaments, the optical fibers, the interstitial filaments, and the circumferential strength filaments combined.

According to another aspect of the invention the central buffer filaments include tensile strength filaments.

According to yet another aspect of the invention an optical fiber cable is provided comprising: an aggregate of elements comprising central strength filaments, optical fibers radially outside of the central strength filaments, and interstitial filaments radially outside of said central strength filaments and circumferentially disposed between the optical fibers; and a wrap radially outside of the aggregate of elements.

According to another aspect of the invention, the cross sectional area of the central strength filaments is between 10% and 80% of the cross sectional area of the central strength filaments, the optical fibers, the interstitial filaments, and the wrap combined.

According to yet another aspect of the invention the optical fiber cable further comprises a sheath radially outside of the wrap of circumferential strength filaments, and the cross sectional area of the central buffer filaments or the central strength filaments is between 10% and 80% of the cross sectional area of the optical fiber cable radially inside of the sheath.

According to yet another aspect of the invention the central buffer filaments and the interstitial filaments have lower modulus of rigidity than those of optical fibers.

According to yet another aspect of the invention, the optical fiber cable comprises: an aggregate of elements comprising central filaments and optical fibers radially outside of said central filaments; and an outer layer radially outside of the aggregate of elements, wherein the cross sectional area of the central filaments is 10% to 80% of the cross sectional area of the central filaments, optical fibers and outer layer combined.

BRIEF DESCRIPTION OF THE ACCOMPANYING DRAWINGS

These and other objects, features and advantages will become clearer from the following description of exemplary embodiments of the invention, read in connection with the accompanying drawings in which.

Figure 15:
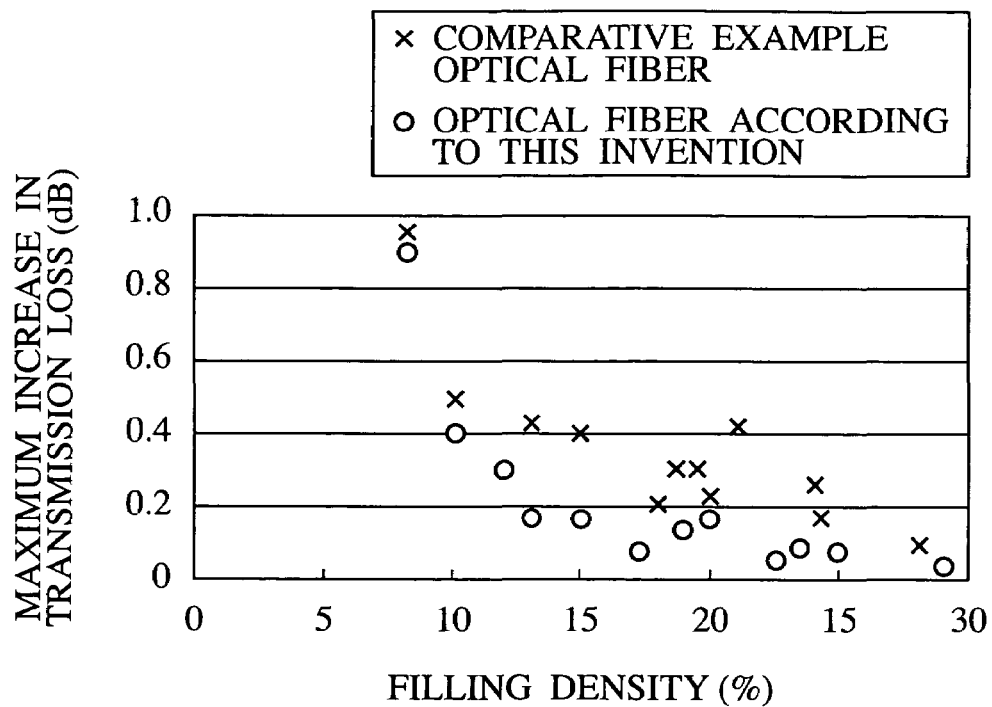
Figure 16:
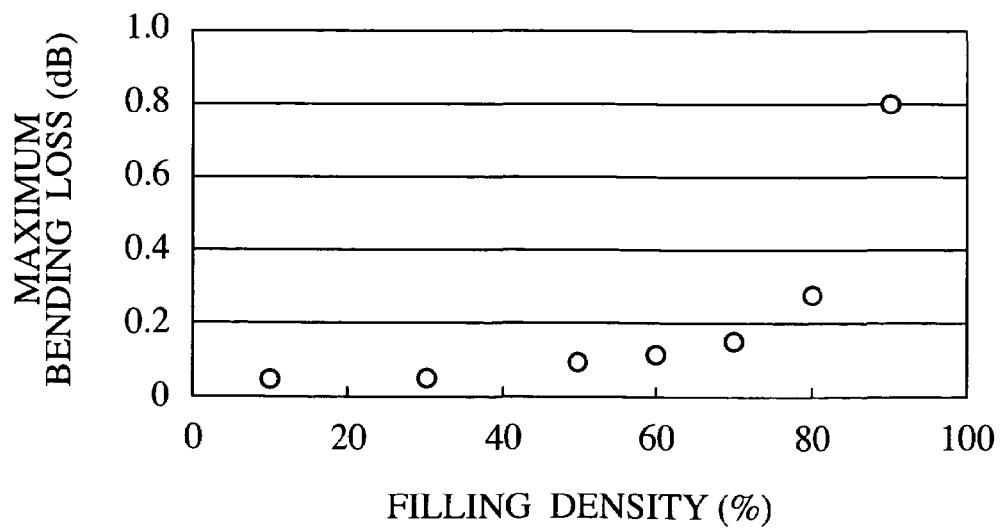

FIG. 15 is a graph illustrating the relationship between maximum increase in transmission loss determined in lateral pressure experiments and filling density of the central buffer filaments for an optical fiber cable according to the fourth exemplary embodiment; and FIG. 16 is a graph illustrating the relationship between maximum bending loss and filling density of the central buffer filaments for an optical fiber cable according to the fourth exemplary embodiment.

DETAILED DESCRIPTION OF THE INVENTION

Exemplary embodiments of the invention will now be described below with reference to the accompanying drawings. The described exemplary embodiments are intended to assist the understanding of the invention, and are not intended to limit the scope of the invention in any way. In these drawings, like reference numerals identify like elements.

Figure 1:
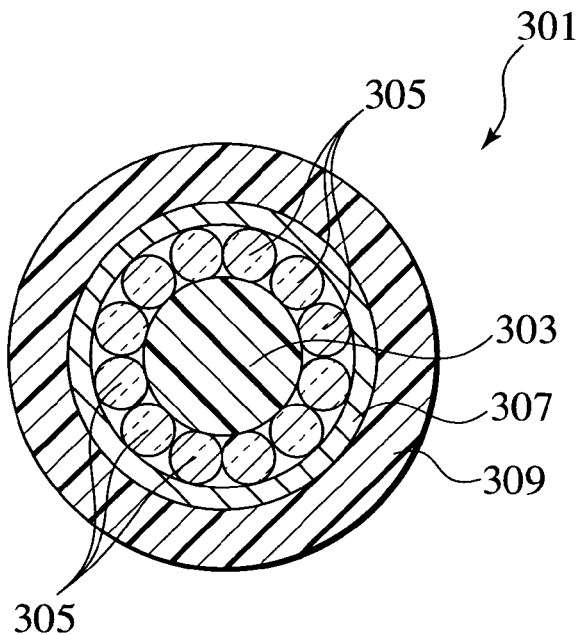
FIG. 1 is a cross sectional view of a related art optical fiber cable.
Figure 2:
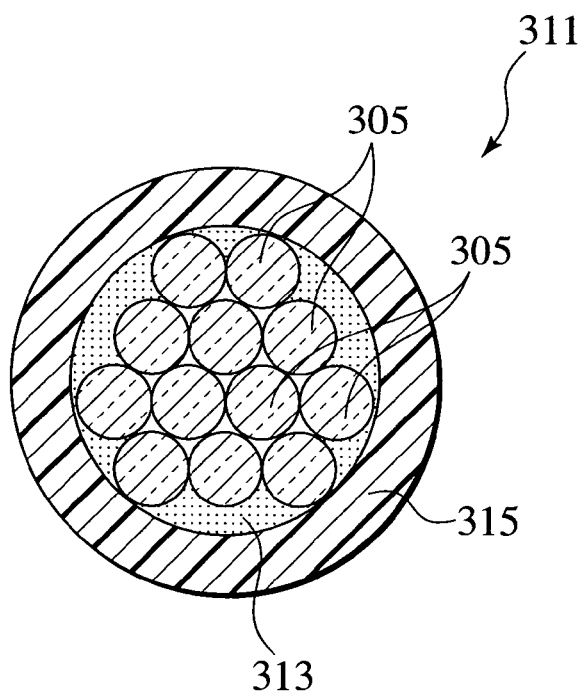
FIG. 2 is a cross sectional view of another related art optical fiber distribution cable.
Figure 3:
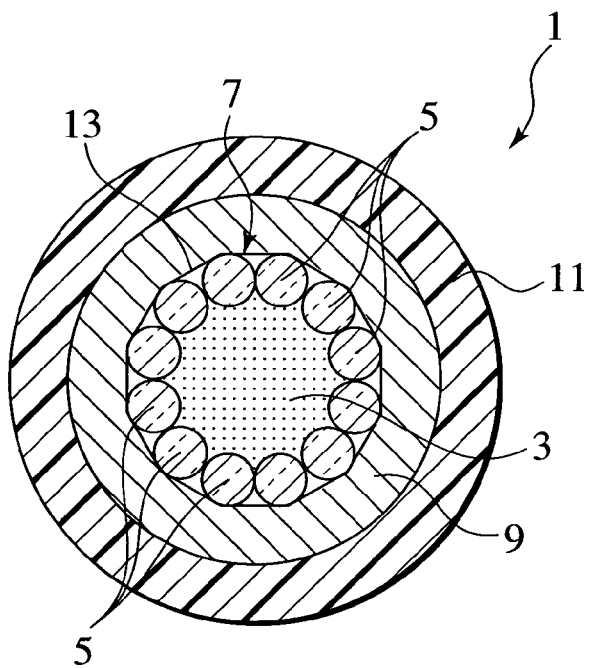
FIG. 3 is a cross sectional view of an optical fiber cable according to a first exemplary embodiment of the invention.

FIG. 3 is a cross sectional view of an optical fiber cable 1 according to a first exemplary embodiment of the invention.

The optical fiber cable 1 comprises an aggregate of elements 7 including central buffer filaments 3 disposed in the center part thereof and a plurality of optical fibers 5 disposed around the central buffer filaments 3, as well as circumferential strength filaments 9 disposed around the external periphery of the aggregate of elements 7 and a sheath 11 covering the circumferential strength filaments 9.

The central buffer filaments 3 consist of, for example, 25,000 denier in total polypropylene yarns that are significantly more pliable in comparison to the optical fibers 5, which may be nylon jacket fibers, for example. More specifically, the central buffer filaments 3 are arranged throughout the cable length because the optical fibers 5 are stranded around the central buffer filaments 3, but any material with lower modulus of rigidity than the optical fibers 5 may be used for the central buffer filaments 3. For example, fibrous material or an extruded plastic is suitable for the central buffer filaments 3, or a tape of non woven fabric or paper shaped into a circular form is also suitable.

In the first embodiment, the circumferential strength filaments 9 perform the major role of a strength member while the central buffer filaments 3 have a limited tensile strength.

The ratio of the cross sectional area of the central buffer filaments 3 in relation to the cross sectional area of the inside of the sheath 11 may be above 10% and below 80%.

The optical fibers 5 are, for example, twelve 0.9 mm O.D. (outside diameter), SM (single mode) type optical fibers (nylon jacket fibers), SZ stranded at a pitch of 3,000 mm so as to be arranged on the external periphery of the central buffer filaments 3. The optical fibers 5 are bound open helically by a binder 13 formed of, for example, 1,000 denier nylon yarn. The optical fibers 5 may be disposed on the central buffer filaments 3 stranded in one direction or alternating SZ direction, or instead of the nylon jacket fibers, UV curable material coated fibers of 0.25 mm O.D. may be used for the optical fibers 5.

The circumferential strength filaments 9 are, for example, 40,000 denier in total aramid yarns helically wound around the aggregate of elements 7 at a pitch of 3,000 mm. The sheath 11 is made of for example polyvinyl chloride resin of a thickness of 0.6 mm, formed by extrusion processing. The outer diameter of the optical fiber cable 1 so formed is 6 mm.

In the optical fiber cable 1 according to the first embodiment as described, the central buffer filaments 3 absorb external lateral pressure or compression applied to the optical fiber cable 1 and avoid cross over of respective optical fibers 5, thereby effectively preventing increase of transmission loss and preventing damage, such as shape deformation or break of the optical fibers 5 due to outside pressure, resulting in improved communications quality.

Figure 4:
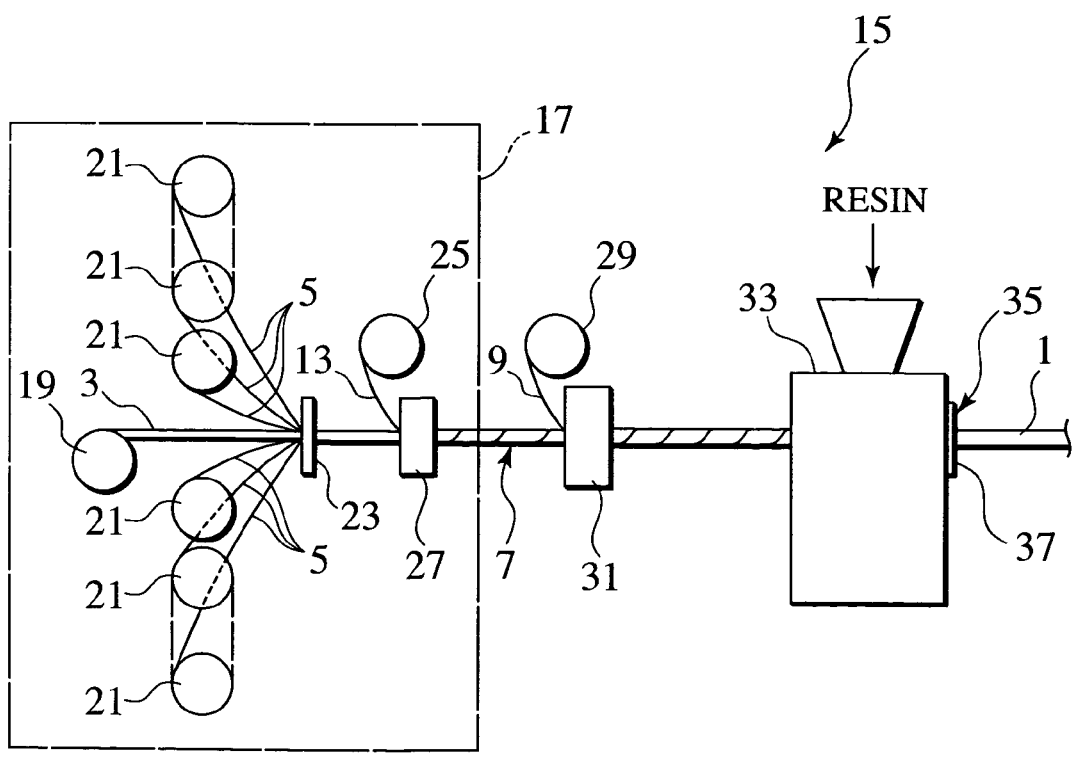
FIG. 4 is a schematic illustration of a device for producing an optical fiber cable according to the first exemplary embodiment of the invention.

FIG. 4 shows an optical fiber cable producing apparatus 15 according to the first embodiment of the invention.

The optical fiber cable producing apparatus 15 comprises an assembling machine 17 for assembling together a plurality of optical fibers 5. The assembling machine 17 comprises a central buffer filaments pay-off bobbin 19 for paying off the central buffer filaments 3, a plurality of optical fiber pay-off bobbins 21 for paying off the plurality of optical fibers 5, a revolver 23 for winding the optical fibers 5 together around the central buffer filaments 3, and a binding machine 27 for applying the binder 13 from a bobbin 25 to the periphery of the assembled optical fibers 5.

A single, center insertion hole (not shown in the drawing) capable of passing the central buffer filaments 3 is provided in the center of the revolver 23, and a plurality of optical fiber insertion holes (not shown in the drawing) each capable of passing one of the optical fibers 5 are provided circumferentially surrounding the center insertion hole. The revolver 23 is constructed so as to repeatedly, alternately rotate in one and then opposite directions, thus alternating the rotation thereof in the clockwise and anticlockwise directions in relation to the direction of the output of the optical fibers 5 in order to have the optical fibers 5 in SZ stranding.

The optical fiber cable producing apparatus 15 further comprises a winding machine 31 for helically winding circumferential strength filaments 9 paid off from the bobbin 29 around the aggregate of elements 7 produced in the assembling apparatus 17 and an extruder 33 for forming the sheath over the circumferential strength filaments 9.

The method of producing the optical fiber cable 1 using the optical fiber cable producing apparatus 15 will now be described.

The central buffer filaments pay-off bobbin 19 pays off the central buffer filaments 3 forward. Simultaneously, the optical fiber pay-off bobbins 21 pay off the optical fibers 5 to the revolver 23. The revolver 23 rotates alternately in one and opposite directions such that the optical fibers 5 are SZ stranded around the central buffer filaments 3 at a pitch of, for example, 3,000 mm. Further, the binder 13 is applied open helically around the SZ stranded optical fibers 5 by the binding machine 27. The aggregate of elements 7 is produced in this way.

The circumferential strength filaments 9 are helically wrapped around the aggregate of elements 7 by the winding machine 31, at a pitch of, for example, 3,000 mm. The outer periphery of the helically wound circumferential strength filaments 9 is covered by the extruded sheath 11, via a dice 37 of an extrusion head 35 of the extruder 33.

The optical fiber cable 1 according to the first embodiment is formed in this way.

Figure 5:
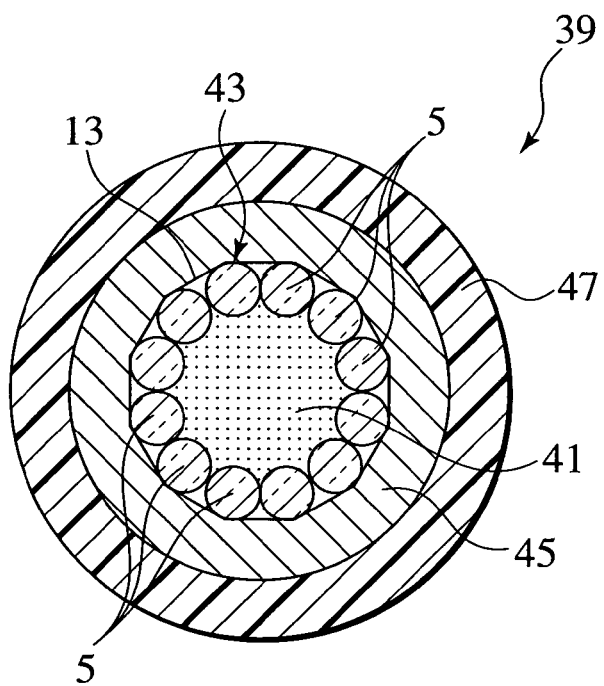
FIG. 5 is a cross sectional view of an optical fiber cable according to a second exemplary embodiment of the invention.

FIG. 5 is a cross sectional view of an optical fiber cable 39 according to a second embodiment of the invention.

The optical fiber cable 39 comprises an aggregate of elements 43 including central strength filaments 41 disposed in the center part thereof and a plurality of optical fibers 5 disposed around the central strength filaments 41. Further, the optical fiber cable 39 comprises circumferential strength filaments 45 disposed around the outer periphery of the aggregate of elements 43, and a sheath 47 covering around the circumferential strength filaments 45.

A point of difference between the optical fiber cable 39 and the optical fiber cable 1 of the first embodiment is that the central strength filaments 41 are disposed in the center part of the optical fiber cable 39, serving both as a shock absorber and a tensile strength member. The central strength filaments 41 are for example, 40,000 denier in total aramid yarns having lower modulus of rigidity than that of the optical fibers 5 (that are for example tight nylon jacketed optical fibers).

In the same manner as the ratio of the central buffer filaments 3 in the first embodiment, the ratio of the cross sectional area of the central strength filaments 41 in relation to the cross sectional area of the inside of the sheath 47 may be above 10% and below 80%.

The optical fibers 5 are, for example, twelve 0.9 mm O.D. SM type optical fibers, SZ stranded at a pitch of 3,000 mm so as to be arranged around the external periphery of the central strength filaments 41. The optical fibers 5 are bound open helically by a binder 13 formed of for example 1,000 denier nylon yarn.

The circumferential strength filaments 45 are for example 20,000 denier in total aramid yarns helically wound around the aggregate of elements 43 at a pitch of 3,000 mm. The sheath 47 is made of for example polyvinyl chloride resin of a thickness of 0.6 mm, formed by extrusion processing. The outer diameter of the optical fiber cable 39 so formed is 6 mm.

In the optical fiber cable 39 according to the second embodiment as described, the central strength filaments 41 serve as the shock absorber against external lateral pressure applied to the optical fiber cable 39 and avoid cross over of respective optical fibers 5, thereby effectively preventing increase of transmission loss and preventing damage, such as shape deformation or break of the optical fibers 5 due to outside lateral pressure, resulting in improved communications quality.

Further, the optical fiber cable 39 of the second embodiment provides improved cable tensile strength, as both the central strength filaments 41 and the helically applied circumferential strength filaments 45 function as a tensile strength member.

Moreover, the optical fiber cable 39 is relatively inexpensive to manufacture as the production method therefor is generally the same as that for the optical fiber cable 1 of the first embodiment.

Figure 6:
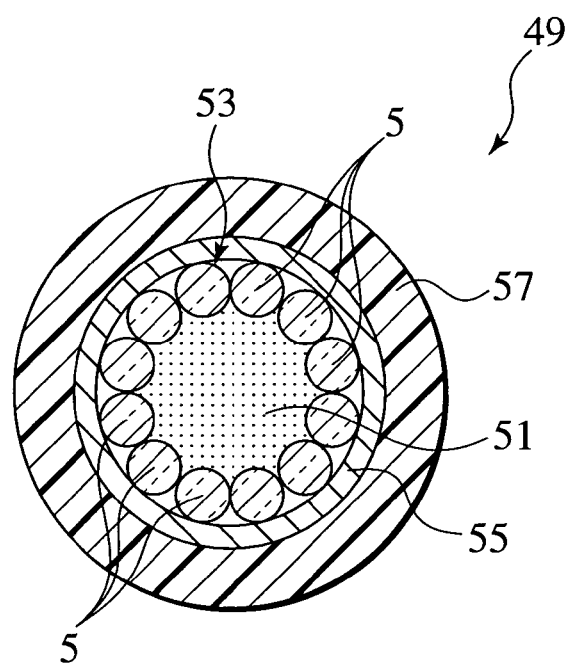
FIG. 6 is a cross sectional view of an optical fiber cable according to a third exemplary embodiment of the invention.

FIG. 6 is a cross sectional view of an optical fiber cable 49 according to a third embodiment of the invention.

The optical fiber cable 49 comprises an aggregate of elements 53 including central strength filaments 51 disposed in the center part thereof and optical fibers 5 disposed around the central strength filaments 51. Further the optical fiber cable 49 comprises a wrap 55 wound around the outer periphery of the aggregate of elements 53, and a sheath 57 covering the wrap 55.

A point of difference between the optical fiber cable 49 and the optical fiber cable 39 of the second embodiment is that instead of having the circumferential strength filaments around the outer periphery of the aggregate of elements, the optical fiber cable 49 has the wrap 55 wound around the aggregate of elements. If the sheath 57 is for example cleaved open by a cleaving blade in order to access the optical fibers 5, the optical fibers 5 are protected by the wrap 55 so as not to come into direct contact with the cleaving blade.

In the construction of this optical fiber cable 49, the central strength filaments 51 are for example, 40,000 denier in total aramid yarns and function as a strength member and shock absorber of the optical fiber cable.

In the same manner as the ratio of the central strength filaments 41 in the second embodiment, the ratio of the cross sectional area of the central strength filaments 51 in relation to the cross sectional area of the inside of the sheath 57 is above 10% and below 80%.

The optical fibers 5 are for example twelve 0.9 mm O.D. SM type optical fibers, SZ stranded at a pitch of 3,000 mm so as to be arranged around the external periphery of the central strength filaments 51.

The wrap 55 is for example, a tape of nonwoven material having a width of 20 mm, helically wrapped on the optical fibers 5; besides nonwoven material however, the wrap 55 may be fibroid material or a plastic tape or paper.

The sheath 57 is made of, for example, polyvinyl chloride resin of a thickness of 0.6 mm, formed by extrusion processing. The outer diameter of the optical fiber cable 49 so formed is 6 mm.

The optical fiber cable 49 of the third embodiment provides the same effects and operations as the optical fiber cable 1 of the first embodiment.

Further, with the optical fiber cable 49 of the third embodiment, there is no concern of damage to the optical fibers 5 coming into direct contact with a cleaving blade, when the sheath 57 is, for example, cleaved open by a cleaving blade in order to access the optical fibers 5.

Moreover, the optical fiber cable 49 is relatively inexpensive to manufacture as the production method therefor is the same as that for the optical fiber cable 1 of the first embodiment.

Figure 7:
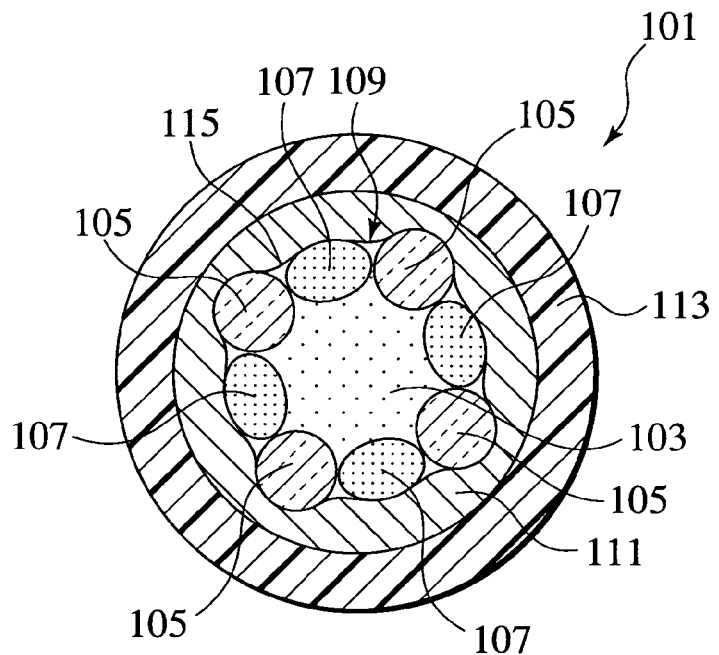
FIG. 7 is a cross sectional view of an optical fiber cable according to a fourth exemplary embodiment of the invention.

FIG. 7 is a cross sectional view of an optical fiber cable 101 according to a fourth embodiment of the invention.

The optical fiber cable 101 comprises an aggregate of elements 109 including a central buffer filaments 103 disposed in the center part thereof, a plurality of optical fibers 105 disposed around the central buffer filaments 103, and a plurality of interstitial filaments 107 disposed between each of the optical fibers 105. Further the optical fiber cable 101 comprises circumferential strength filaments 111 circumferentially disposed around the aggregate of elements, and a sheath 113 covering the circumferential strength filaments 111.

The central buffer filaments 103 are for example, 25,000 denier in total polypropylene yarns that are significantly more pliable in comparison to the optical fibers 105, which may be nylon jacket fibers for example. More specifically, the central buffer filaments 103 are long throughout the cable length because the optical fibers 105 are stranded around the central buffer filaments 103, but any material with lower modulus of rigidity than the optical fibers 105 may be used for the central buffer filaments 103. For example, fibrous material or extruded plastic is suitable for the central buffer filaments 103, or a tape of non woven fabric or paper shaped into a circular form is also suitable.

The circumferential strength filaments 111 perform the major role of a tensile strength member in this fourth embodiment and the central buffer filaments 103 have a limited tensile strength.

The ratio of the cross sectional area of the central buffer filaments 103 in relation to the cross sectional area of the inside of the sheath 113 is above 10% and below 80%.

The optical fibers 105 are, for example, four 0.9 mm O.D., SM type optical fiber (nylonjacket fibers), disposed substantially evenly around the outer periphery of the central buffer filaments 103.

The interstitial filaments 107 are for example, 25,000 denier in total polypropylene yarns, significantly more pliable in comparison to the optical fibers 105, which may be tight nylonjacketed optical fiber for example. More specifically, any material with lower modulus of rigidity than the optical fibers 105 may be used for the interstitial filaments 107. For example, fibrous material or extruded plastic is suitable for the interstitial filaments 107, or a tape of non woven fabric or paper shaped into a circular form is also suitable.

Interstitial filaments 107 are disposed adjacently between the optical fibers 105. More specifically, the plurality of interstitial filaments 107 and the plurality of optical fibers 105 are SZ stranded at a pitch of for example 3,000 mm around the central buffer filaments 103, such that the interstitial filaments 107 and optical fibers 105 are disposed adjacently and mutually alternately, covering the entire outer periphery of the central buffer filaments 103. The optical fibers 105 and interstitial filaments 107 are bound open helically by a binder 115 formed of for example 1,000 denier nylon yarn.

The optical fibers 105 and the interstitial filaments 107 may be stranded around the central buffer filaments 103 in one direction or SZ direction or arranged around the central buffer filaments 103 without being stranded, if a constant positional relationship, of being arranged adjacently and alternately, is to be maintained between optical fibers 105 and the interstitial filaments 107. Further, UV curable material coated fibers of 0.25 mm O.D. for example, may be used for the optical fibers 105.

The circumferential strength filaments 111 are for example 40,000 denier in total aramid yarns, helically wound around the aggregate of elements 109 at a pitch of 3,000 mm. The sheath 113 is made of, for example, polyvinyl chloride resin of a thickness of 0.6 mm, formed by extrusion processing. The outer diameter of the optical fiber cable 101 so formed is 6 mm.

The optical fiber cable 101 according to the fourth embodiment as described provides the same effects and operations as the optical fiber cable 1 of the first embodiment.

Moreover, as the interstitial filaments 107 distribute evenly the optical fibers 105 around the outer periphery of the central buffer filaments 103, this prevents the optical fibers 105 moving to offset positions with respect to the central buffer filaments 103, thereby effectively preventing increase in transmission loss or breaking of the optical fiber, resulting in improved communications quality.

Figure 8:
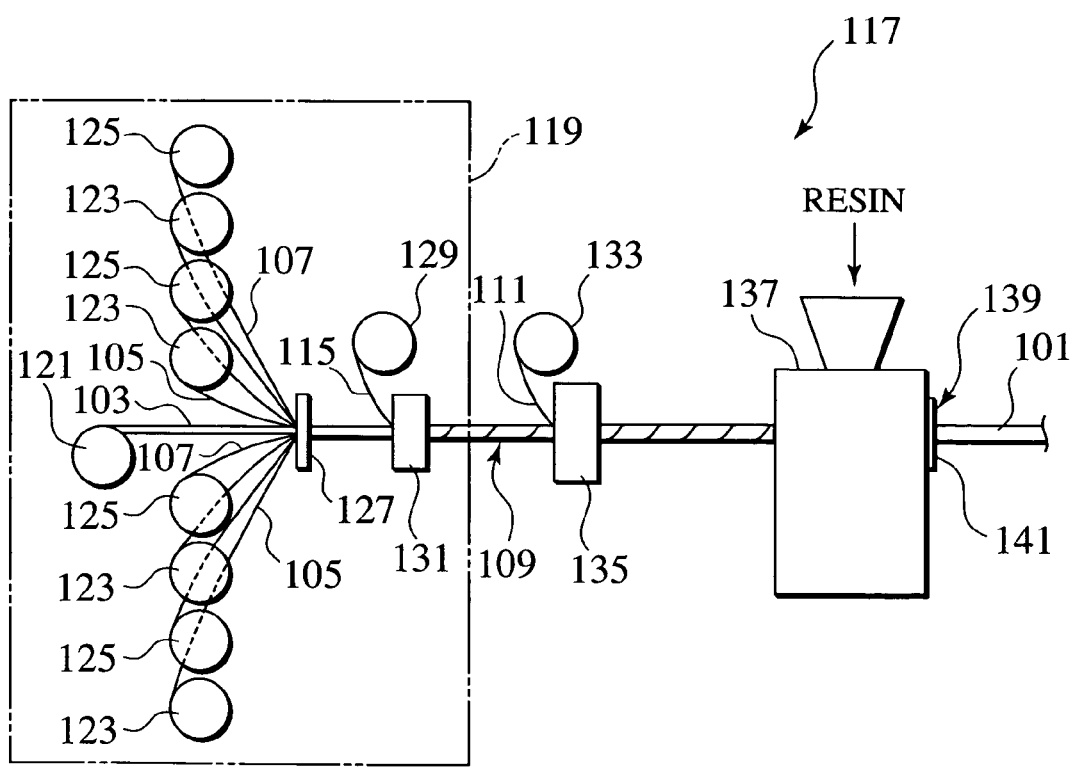
FIG. 8 is a schematic illustration of a device for producing an optical fiber cable according to the fourth exemplary embodiment of the invention.

FIG. 8 is an illustration of an optical fiber cable production apparatus 117 for producing an optical fiber cable 101 according to the fourth embodiment of the invention.

The optical fiber cable production apparatus 117 comprises an assembling machine 119 for assembling together a plurality of optical fibers 105. The assembling machine 119 comprises a single central buffer filaments pay-off bobbin 121 for paying off the central buffer filaments 103, a plurality of optical fiber pay-off bobbins 123 for paying off the plurality of optical fibers 105, a plurality of interstitial filaments pay-off bobbins 125 for paying off the plurality of interstitial filaments 107, a revolver 127 for stranding the optical fibers 105 and the interstitial filaments 107 arranged alternately around the outer periphery of the central buffer filaments 103, and a binding machine 131 for applying the binder 115 from a bobbin 129 to the periphery of the assembled optical fibers 105 and interstitial filaments 107.

A single, center insertion hole (not shown in the drawing) capable of passing the central buffer filaments 103 is provided in the center of the revolver 127, and a plurality of optical fiber insertion holes (not shown in the drawing) each capable of passing one of the optical fibers 105 and a plurality of interstitial filaments insertion holes (not shown in the drawing) each capable of passing one of the interstitial filaments 107 are provided circumferentially surrounding the center insertion hole. The revolver 127 is constructed so as to repeatedly, alternately rotate in one and then opposite directions, thus alternating the rotation thereof in the clockwise and anti-clockwise directions in relation to the direction of the output of the optical fibers 105 and the interstitial filaments 107 in order to strand the optical fibers 105 and the interstitial filaments 107 in SZ stranding.

The optical fiber cable production apparatus 117 further comprises a winding machine 135 for helically winding the circumferential strength filaments 111 paid off from a bobbin 133 around the aggregate of elements 109 assembled by the assembling machine 119 and an extruder 137 for extruding the sheath 113 around the helically wound circumferential strength filaments 111.

The method of producing the optical fiber cable 101 using the optical fiber cable production apparatus 117 will now be described.

The central buffer filaments pay-off bobbin 121 pays off the central buffer filaments 103 forward. Simultaneously, the optical fiber pay-off bobbins 123 and the interstitial filaments pay-off bobbins 125 pay off the optical fibers 105 and the interstitial filaments 107 forward to the revolver 127. The revolver 127 rotates alternately in one and opposite directions such that the optical fibers 105 and the interstitial filaments 107 are SZ stranded around the central buffer filaments 103 at a pitch of for example 3,000 mm. Further, the binder 115 is bound open helically around the SZ stranded optical fibers 105 and interstitial filaments 107 by the binding machine 131. The aggregate of elements 109 is produced in this way.

The circumferential strength filaments 111 are helically wound around the aggregate of elements 109 by the winding machine 135, at a pitch of for example 3,000 mm. The outer periphery of the helically wound circumferential strength filaments 111 is covered by the extruded sheath 113, via a dice 141 of an extrusion head 139 of the extruder 137.

The optical fiber cable 101 according to the fourth embodiment is formed in this way.

Figure 9:
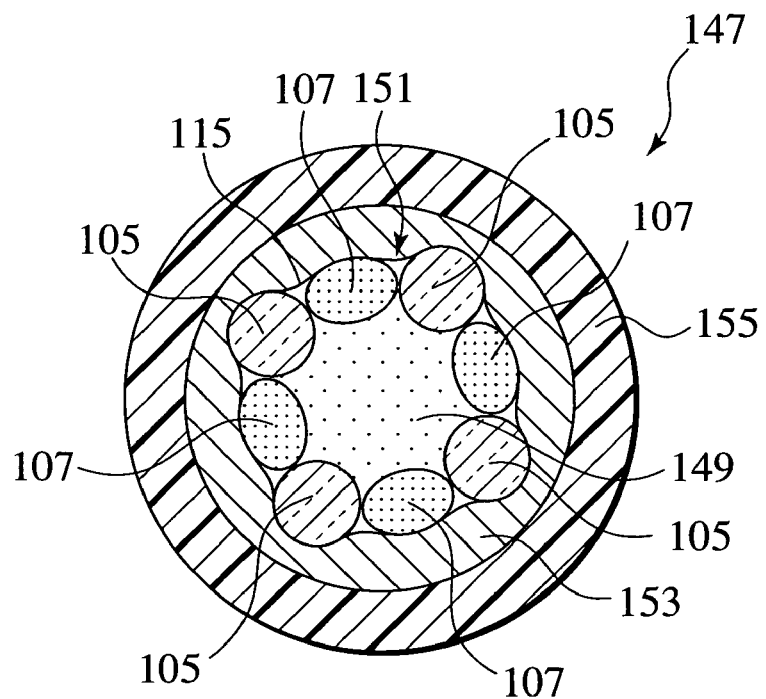
FIG. 9 is a cross sectional view of an optical fiber cable according to the fifth exemplary embodiment of the invention.

FIG. 9 is a cross sectional view of an optical fiber cable 147 according to a fifth embodiment of the invention.

The optical fiber cable 147 comprises an aggregate of elements 151 including central strength filaments 149 disposed in the center part thereof, a plurality of optical fibers 105 disposed around the central strength filaments 149, and interstitial filaments 107 disposed between each of the optical fibers 105. Further, the optical fiber cable 147 comprises circumferential strength filaments 153 disposed around the outer periphery of the aggregate of elements 151, and a sheath 155 covering the circumferential strength filaments 153.

A point of difference between the optical fiber cable 147 and the optical fiber cable of the fourth embodiment is that the central strength filaments 149 are disposed in the center part of the optical fiber cable 147, serving both as a shock absorber and a tensile strength member. The central strength filaments 149 are for example, 40,000 denier in total aramid yarns with lower modulus of rigidity than the optical fibers 105 (that are for example tight nylon jacketed optical fibers).

In the same manner as the ratio of the central buffer filaments 103 in the fourth embodiment, the ratio of the cross sectional area of the central strength filaments 149 in relation to the cross sectional area of the inside of the sheath 155 is above 10% and below 80%.

The optical fibers 105 are, for example, four 0.9 mm O.D. SM type optical fibers. The interstitial filaments 107 are for example, four 2,500 denier strands of polypropylene yarn, being significantly more flexible and having a lower modulus of rigidity than the optical fibers 105. The optical fibers 105 and the interstitial filaments 107 are SZ stranded at a pitch of 3,000 mm so as to be arranged alternately around the external periphery of the central strength filaments 149. The optical fibers 105 and the interstitial filaments 107 are bound by a binder 115 formed of for example 1,000 denier nylon yarn.

The circumferential strength filaments 153 are, for example, 20,000 denier in total aramid yarns helically wound around the aggregate of elements 151 at a pitch of 3,000 mm. The sheath 155 is made of for example polyvinyl chloride resin of a thickness of 0.6 mm, formed by extrusion processing. The outer diameter of the optical fiber cable 147 so formed is 6 mm.

The optical fiber cable 147 of the fifth embodiment provides the same effects and operations as the optical fiber cable 101 of the fourth embodiment.

Further, the optical fiber cable 147 of the fifth embodiment provides improved cable strength, as both the central strength filaments 149 and the helically wound circumferential strength filaments 153 function as a tensile strength member.

Moreover, the optical fiber cable 147 is relatively inexpensive to manufacture as the production method therefor is generally the same as that for the optical fiber cable 101 of the fourth embodiment.

Figure 10:
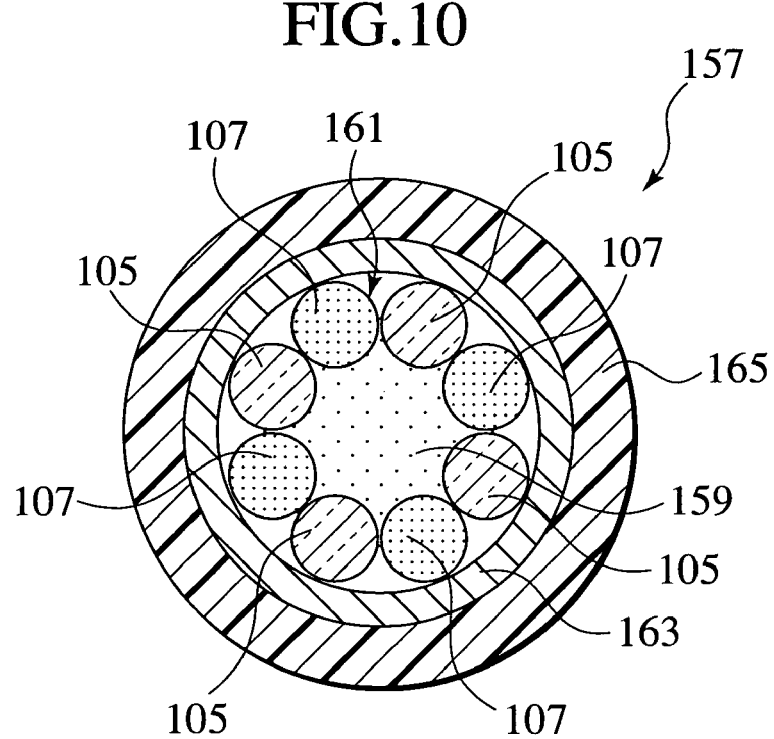
FIG. 10 is a cross sectional view of an optical fiber cable according to the sixth exemplary embodiment of the invention.

FIG. 10 is a cross sectional view of an optical fiber cable according to a sixth embodiment of the invention.

The optical fiber cable 157 comprises an aggregate of elements 161 including central strength filaments 159 disposed in the center part thereof, a plurality of optical fibers 105 disposed around the aggregate of elements 161 and a plurality of interstitial filaments 107 disposed between each of the optical fibers 105. Further, the optical fiber cable 157 comprises a wrap 163 wound around the outer periphery of the aggregate of elements 161, and a sheath 165 covering the wrap 163.

A point of difference between the optical fiber cable 157 and the optical fiber cable 147 of the fourth embodiment is that instead of having the circumferential strength filaments around the outer periphery of the aggregate of elements, the optical fiber cable 157 has the wrap 163 wound around the aggregate of elements. If the sheath 165 is for example cleaved open by a cleaving blade in order to access the optical fibers 105, the optical fibers 105 are protected by the wrap 163 so as not to come into direct contact with the cleaving blade.

In the construction of this optical fiber cable 157, the central strength filaments 159 are for example, 40,000 denier in total aramid yarns and function as a strength member and shock absorber of the optical fiber cable.

In the same manner as the ratio of the central strength filaments 149 in the fifth embodiment, the ratio of the cross sectional area of the central strength filaments 159 in relation to the cross sectional area of the inside of the sheath 165 is above 10% and below 80%.

The optical fibers 105 are, for example, four 0.9 mm O.D. SM type optical fibers. The interstitial filaments 107 are, for example, four strands of 2,500 denier polypropylene yarn. The optical fibers 105 and the interstitial filaments 107 are SZ stranded at a pitch of 3,000 mm so as to be arranged alternately around the external periphery of the central strength filaments 159.

The wrap 163 is, for example, a tape of nonwoven material having a width of 20 mm, helically wound around the optical fibers 105 and the interstitial filaments 107. Besides nonwoven material however, the wrap 163 may be fibroid material or a plastic tape or paper.

The sheath 165 is made of, for example, polyvinyl chloride resin of a thickness of 0.6 mm, formed by extrusion processing. The outer diameter of the optical fiber cable 157 so formed is 6 mm.

The optical fiber cable 157 of the sixth embodiment provides the same effects and operations as the optical fiber cable 101 of the fourth embodiment.

Further, with the optical fiber cable 157 of the sixth embodiment, there is no concern of damage to the optical fibers 105 coming into direct contact with a cleaving blade, as the sheath 165 is for example cleaved by a cleaving blade in order to access the optical fibers 105.

Moreover, the optical fiber cable 157 is relatively inexpensive to manufacture as the production method therefor is the same as that for the optical fiber cable 101 of the fourth embodiment.

The above described embodiments of an optical fiber cable according to the invention provide the following effects.

(1) If the optical fiber cable sustains lateral pressure or compression, transmission loss increase can be minimized as the central buffer filaments or central strength filaments are able to provide gradual bending of the optical fibers.

(2) The central buffer filaments or central strength filaments absorb externally exerted lateral pressure or compression, reducing the press force to the optical fibers, thereby reducing a chance of fiber breakage or shape deformation of the optical fiber.

(3) As the ratio of the cross sectional area of the central buffer filaments or central strength filaments in relation to the cross sectional area of the inside of the sheath is above 10% and below 80%, transmission loss increase and bending loss from lateral pressure or compression can be effectively suppressed.

(4) When the central buffer filaments or central strength filaments include tensile strength filaments, the central buffer filaments or central strength filaments can withstand the tensile load applied to the optical fiber cable and can also serve as a tensile strength member.

(5) By having the central buffer filaments or central strength filaments (and interstitial filaments) of lower modulus of rigidity than the optical fibers, the central buffer filaments or central strength filaments (and interstitial filaments) can easily absorb external lateral pressure or compression exerted on the optical fiber cable.

PRACTICAL EXAMPLE 1

Experimental optical fiber cables 1 of the first embodiment shown in FIG. 3 were produced. Specifically, twelve 0.9 mm O.D. SM type optical fibers 5 were SZ stranded at a pitch of 3,000 mm around a central strength filaments 3 formed of 25,000 denier in total polypropylene yarns, and a binder 13 of 1,000 denier nylon yarn was bound thereon to produce an aggregate of elements 7. Circumferential strength filaments 9 comprising 40,000 denier in total aramid yarns were helically wound at a pitch of 300 mm around the aggregate of elements 7, while a sheath 11 of polyvinyl chloride having a thickness of 0.6 mm was applied as a covering therefor, producing an optical fiber cable 1 having a diameter of 6 mm.

Firstly, a lateral pressure or compression test was conducted using experimental optical fiber cables 1 having different volume of central buffer filaments 3 therein. The lateral pressure or compression test was based on Telcordia GR-409 CORE, Generic Requirements for Premise Fiber Optic Cable. In essence, a constant load of 1,000 N was applied for 10 minutes to the lateral of each optical fiber cable using a lateral pressure or compression plate of a width of 100 mm. The measurement wavelength was 1.55 μm.

Figure 11:
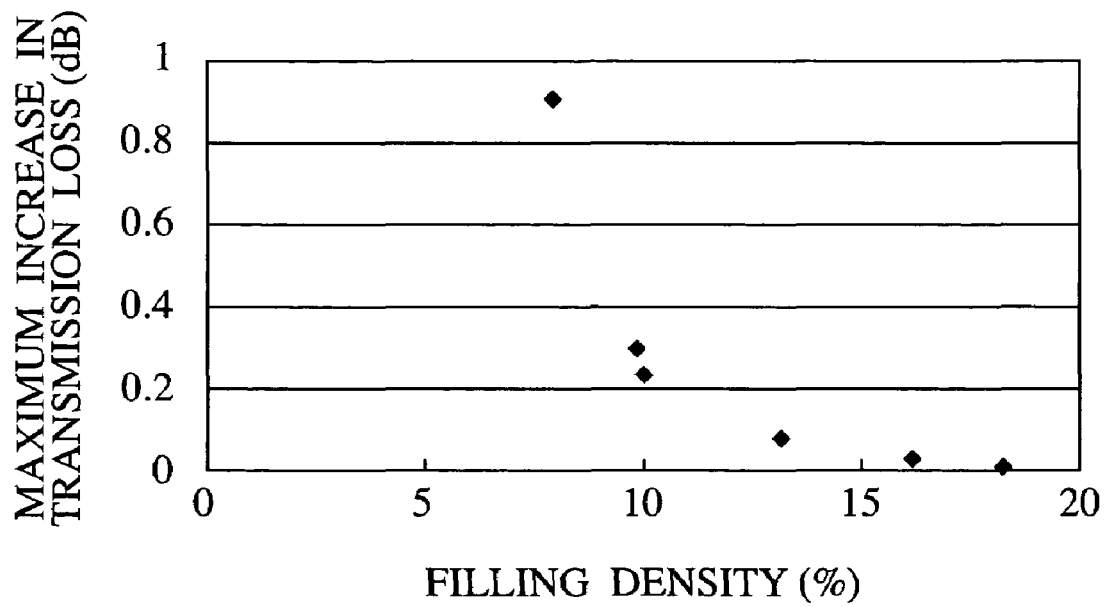
FIG. 11 is a graph illustrating the relationship between maximum increase in transmission loss (dB) determined in lateral pressure experiments and filling density of the central buffer filaments for an optical fiber cable according to the first exemplary embodiment.

FIG. 11 is a graph illustrating results of the lateral pressure or compression test, showing the relationship between maximum increase in amount of transmission loss (dB) determined by lateral pressure experiment and filling density of the central buffer filaments 3. The maximum increase in amount of transmission loss from among data for an experiment performed 10 times on the same cable (data for transmission loss being derived from 12 optical fibers×10 times=120 points) is shown in FIG. 11.

In FIG. 11, volume of the central buffer filaments 3 are shown as filling density (%). The filling density is defined as the net (not including air space) ratio of cross sectional area occupied by the central buffer filaments in relation to the cross sectional area of the inner side of the sheath of an optical fiber cable.

As shown in FIG. 11, the results of the lateral pressure experiment confirm that at a filling density of above 10%, the maximum increase in amount of transmission loss (dB) in the lateral experiment decreases dramatically, reaching below approximately 0.25 dB.

Next, bending loss was measured using the experimental optical fiber cables 1 having different volume of central buffer filaments 3. More specifically, each optical fiber cable 1 was wound once around a mandrel of a diameter of 40 mm, and transmission loss was measured at a measurement wavelength of 1.55 μm.

Figure 12:
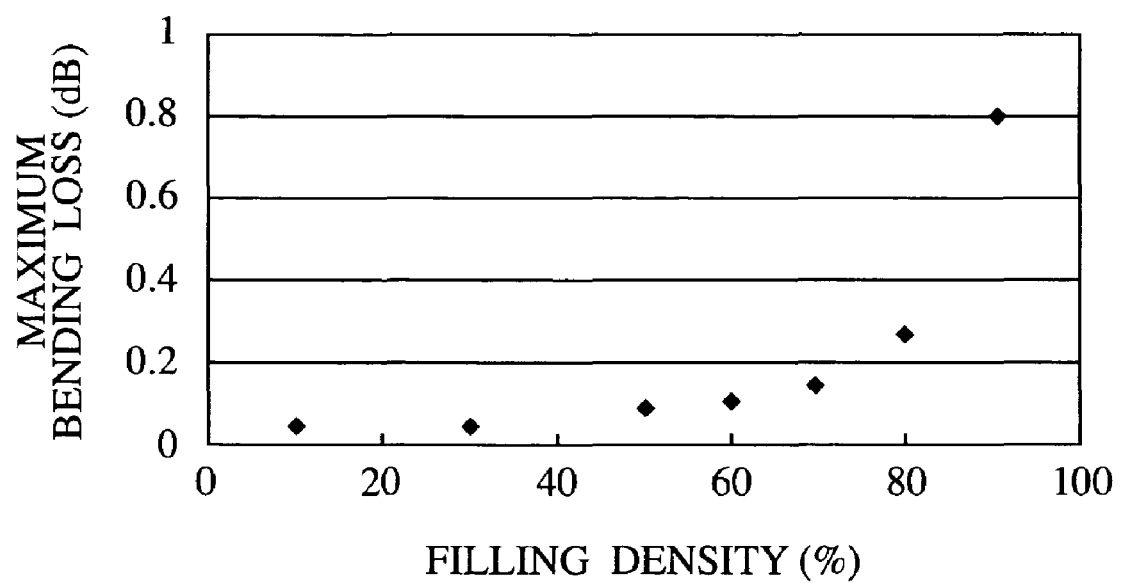
FIG. 12 is a graph illustrating the relationship between maximum bending loss and filling density of the central buffer filaments for an optical fiber cable according to the first exemplary embodiment.

FIG. 12 is a graph illustrating the measured results, showing the relationship between filling density of the central buffer filaments 3 and maximum increase in amount of transmission loss when each optical fiber cable 1 is wound around a mandrel of a diameter of 40 mm, in other words, maximum bending loss (dB). In FIG. 12, data for the optical fiber recording the greatest bending loss among twelve optical fibers was plotted. Filling density (%) of FIG. 12 is defined by the same definition for filling density as that of FIG. 11.

As shown in FIG. 12, the results of measured bending loss confirm that when filling density of central buffer filaments 3 is below 80%, maximum bending loss is below approximately 0.25 dB, and when that density is above 80%, bending loss increases dramatically.

The reason for this is that, in producing an optical fiber cable 1 having greater filling density of central buffer filaments 3 maintaining a standard cable diameter of 6 mm, the binder 13 must constrict tightly in binding the optical fibers 5 and the central buffer filaments 3. However, when the binder 13 constricts tightly the optical fibers 5 and the central buffer filaments 3 themselves become harder, and it becomes increasingly difficult for the optical fiber cable 1 to bend smoothly due to decrease in flexural rigidity of the central buffer filaments 3. Thus, the curvature of the optical fibers 5 is increased locally and the bending loss accordingly increases.

Therefore, by making the filling density of the central buffer filaments 3 above 10% and below 80% the maximum of transmission loss due to exerted external lateral pressure can be effectively prevented, enabling an optical fiber cable providing improved communications quality to be produced.

PRACTICAL EXAMPLE 2

Experimental optical fiber cables 101 of the fourth embodiment shown in FIG. 7 were produced. Specifically, four 0.9 mm O.D. SM type optical fibers 105 and four interstitial filaments 107 of 2,500 denier polypropylene yarn were SZ stranded at a pitch of 3,000 mm so as to be arranged alternately around a central buffer filaments 103 formed of 25,000 denier in total polypropylene yarns, and a binder 115 of 1,000 denier nylon yarn was bound thereon to produce an aggregate of elements 109. Circumferential strength filaments 111, comprising 40,000 denier in total aramid yarns were helically wound at a pitch of 300 mm around the aggregate of elements 109, while a sheath 113 of polyvinyl chloride of a thickness of 0.6 mm was applied as a covering therefor, producing an optical fiber cable 101 having a diameter of 6 mm.

Figure 13:
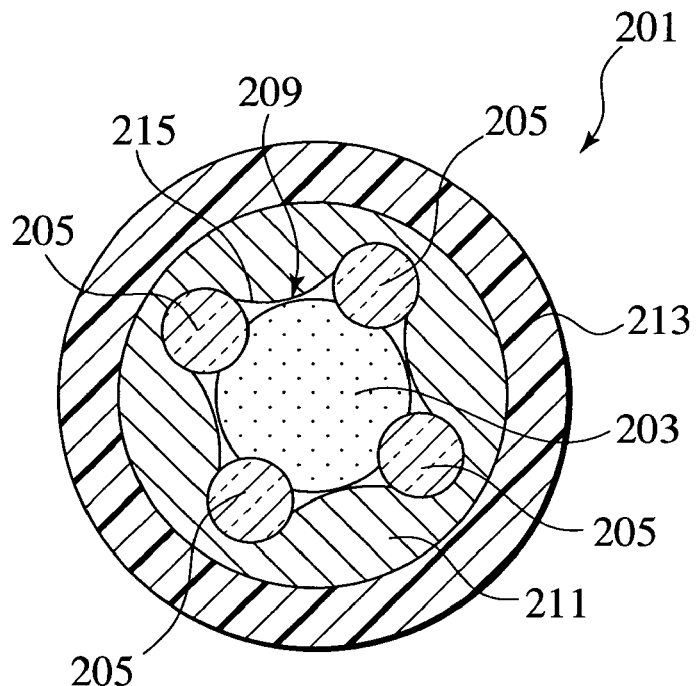
FIG. 13 is a cross sectional view of an optical fiber cable experimentally produced to provide a comparative example for the optical fiber cable according to the fourth exemplary embodiment.

Moreover, optical fiber cables 201 shown in FIG. 13 were produced to provide comparative examples. The optical fiber cables 201 do not have the interstitial filaments 107 of the optical fiber cables 101. More specifically, four 0.9 mm O.D. SM type optical fibers 205 were SZ stranded at a pitch of 3,000 mm so as to be arranged alternately around a central buffer filaments 203 formed of 25,000 denier in total polypropylene yarns, and a binder 215 of 1,000 denier nylon yarn was bound thereon to produce an aggregate of elements 209. Circumferential strength filaments 211 comprising 40,000 denier in total aramid yarns were helically wound at a pitch of 300 mm around the aggregate of elements 209, while a sheath 213 of polyvinyl chloride of a thickness of 0.6 mm was applied as a covering therefor, producing an optical fiber cable 201 having a diameter of 6 mm.

Figure 14:
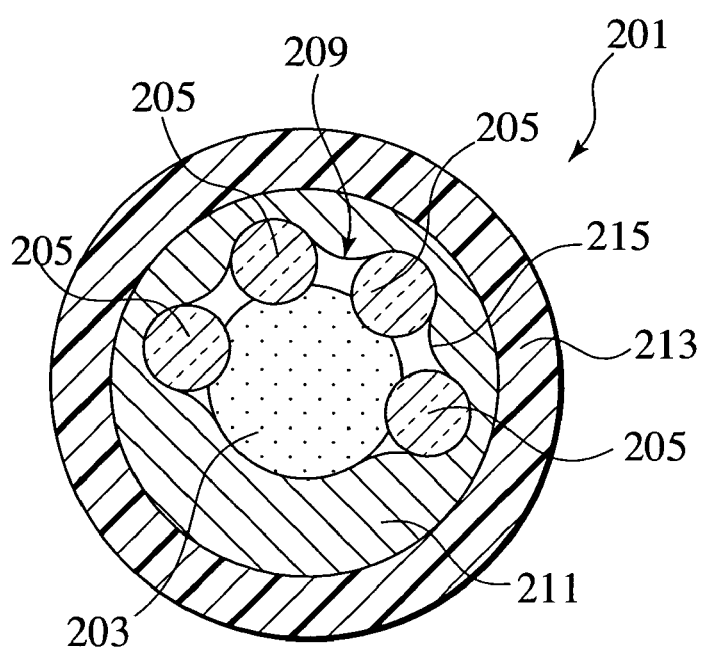
FIG. 14 is a cross sectional view of the optical fiber cable shown in FIG. 13 with the optical fibers having offset positions.

As each comparative example optical fiber cable 201 has a relatively low fiber count of optical fibers 205 in relation to the filling density of the central buffer filaments 203, as shown in FIG. 14, during manufacture the optical fibers 205 are arranged at offset positions in relation to the central buffer filaments 203, and it is easy for the optical fibers 205 to cross over each other, resulting in fiber breaks or increase in transmission loss. Again, even if during manufacture the plurality of optical fibers 205 are arranged evenly, as the optical fibers 205 have a substantial degree of freedom to move, when the optical fiber cable 201 is installed the optical fibers 205 move and easily cross over each other or contact hard each other inside the sheath 213.

When external lateral pressure is exerted on the optical fiber cable 201 in which this phenomena arises, the central buffer filaments 203 do not function effectively as a shock absorber and there is a chance of increase in transmission loss or optical fiber breaks.

A lateral pressure test, or compression test, was conducted using experimental optical fiber cables 101 of the fourth embodiment having different volume of central buffer filaments 103 therein and the comparative examples 201. The lateral pressure test was based on Telcordia GR-409 CORE, Generic Requirements for Premise Fiber Optic Cable. In essence, a constant load of 1,000N was applied for 10 minutes to the lateral of each optical fiber cable using a lateral pressure plate of a width of 100 mm. The measurement wavelength was 1.55 µm.

FIG. 15 is a graph illustrating results of the lateral pressure test, showing the relationship between maximum increase in amount of transmission loss (dB) determined in the lateral pressure experiment and filling density of the central buffer filaments. The maximum increase in amount of transmission loss from among data for an experiment performed 10 times on the same cable (data for transmission loss being derived from 4 optical fibers×10 times=40 points) is shown in FIG. 15.

FIG. 15 uses the same definition of filling density as FIG. 11, i.e., the net (not including air layer) ratio of cross sectional area occupied by the central buffer filaments in relation to the cross sectional area of the inner side of the sheath of an optical fiber cable.

As shown in FIG. 15, the test results indicate a tendency, at a central buffer filaments filling density of below 30%, for maximum increase in amount of transmission loss in the lateral experiment to decrease depending on the increases of filling density. Maximum increase in amount of transmission loss (dB) for the optical fiber cable 101 when filling density of central buffer filaments is 8% was 0.9 dB, and this decreased dramatically to below 0.4 dB when filling density was above 10%.

Further, the optical fiber cable 101 with the interstitial filaments 107 had a smaller amount of transmission loss increase in the lateral pressure test than the comparative example 201 without interstitial filaments 107. This illustrates that the interstitial filaments 107 effectively prevent transmission loss increase from the lateral pressure.

The fact that the apparent increase in the amount of transmission loss was observed in the comparative example 201 is understood to be because the optical fibers 205 cross over each other or contact tightly each other, having higher modulus of rigidity than the central buffer filaments 203.

Next, bending loss was measured using the experimental optical fiber cables 101 having different volumes of central buffer filaments 103. More specifically, optical fiber cable 101 was wound once around a mandrel of a diameter of 40 mm, and transmission loss was measured at a measurement wavelength of 1.55 µm.

FIG. 16 is a graph illustrating the measured results for bending loss, showing the relationship between filling density of central buffer filaments 103 and maximum increase in amount of transmission loss when optical fiber cable 101 is wound around a mandrel of a diameter of 40 mm, in other words, maximum bending loss (dB). In FIG. 16, data for the optical fiber recording the greatest bending loss among the four optical fibers was plotted. Filling density (%) of FIG. 16 is defined by the same definition for filling density as that of FIG. 15.

As shown in FIG. 16, the results of measured bending loss confirm that when filling density of central buffer filaments 103 is above 80%, bending loss increases dramatically.

The reason for this is the same as the reason described with respect to practical example 1.

Accordingly, by making the filling density of the central buffer filaments 103 above 10% and below 80% the maximum of transmission loss due to exerted external lateral pressure can be effectively prevented, enabling an optical fiber cable providing improved communications quality to be produced.

Although the invention has been described above by reference to certain exemplary embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An optical fiber cable comprising:
   a plurality of ununited buffering filaments for absorbing external force applied to the optical fiber cable;
   a plurality of optical fibers disposed radially outside of said plurality of buffering filaments; and
   a plurality of strength filaments disposed radially outside of said plurality of optical fibers;
   wherein each of said plurality of optical fibers is in direct contact with some of said plurality of buffering filaments.

2. The optical fiber cable according to claim 1, wherein the cross sectional area of said plurality of buffering filaments is between 10% and 80% of the cross sectional area of the plurality of buffering filaments, the plurality of optical fibers, and the plurality of strength elements combined.

3. The optical fiber cable according to claim 1, further comprising a sheath disposed radially outside said plurality of strength filaments.

4. The optical fiber cable according to claim 3, wherein the cross sectional area of said plurality of buffering filaments is between 10% and 80% of the cross sectional area of the optical fiber cable radially inside of the sheath.

5. The optical fiber cable according to claim 1, wherein said plurality of buffering filaments have a lower modulus of rigidity than the optical fibers.

6. The optical fiber cable according to claim 1, wherein said plurality of buffering filaments include tensile strength filaments.

7. The optical fiber cable according to claim 1, wherein said plurality of buffering filaments are arranged at the radial center of the optical fiber cable.

* * * * *